United States Patent
Naeimi et al.

(10) Patent No.: US 6,363,416 B1
(45) Date of Patent: Mar. 26, 2002

(54) SYSTEM AND METHOD FOR AUTOMATIC ELECTION OF A REPRESENTATIVE NODE WITHIN A COMMUNICATIONS NETWORK WITH BUILT-IN REDUNDANCY

(75) Inventors: Ramin Naeimi, San Jose; Tamara J. Iverson, Santa Clara, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/141,829

(22) Filed: Aug. 28, 1998

(51) Int. Cl.$^7$ .................. G06F 15/16; G06F 15/173
(52) U.S. Cl. .......................... 709/209; 709/226
(58) Field of Search .................. 709/208, 209, 709/229, 225, 226; 375/356; 370/85.3, 445, 60, 943, 260; 364/200; 395/200.39

(56) References Cited

U.S. PATENT DOCUMENTS

| | | | | |
|---|---|---|---|---|
| 4,814,984 A | * | 3/1989 | Thompson | 709/209 |
| 4,866,702 A | * | 9/1989 | Shimizu | 370/438 |
| 5,555,548 A | * | 9/1996 | Iwai | 709/208 |
| 5,838,909 A | * | 11/1998 | Roy | 709/209 |
| 5,862,348 A | * | 1/1999 | Pedersen | 709/229 |
| 5,933,602 A | * | 8/1999 | Grover | 709/224 |

* cited by examiner

Primary Examiner—Glenton B. Burgess
Assistant Examiner—Kenneth W. Fields
(74) Attorney, Agent, or Firm—Wagner, Murabito & Hao LLP

(57) ABSTRACT

A system and method for automatic election a representative node within a communication network with built-in redundancy. In a communication network where data is distributed from a central location to multiple nodes, the present invention enables one of the nodes to be automatically identified as a master of the nodes for retrieving data from the central location and then transmitting the data to all peer nodes interested in receiving the data. No manual intervention or pre-operation designation of a master is required within the present invention. As such, repetitive requests for information by individual nodes are eliminated, and the volume of network traffic is thereby significantly localized. Hence, the performance of the network is greatly enhanced. Furthermore, rather than arbitrarily preassigning particular node(s) to serve as a master, the present invention provides an automated process by which a new master is dynamically elected whenever an existing master fails or none exists. Therefore, the present invention provides built-in redundancy which greatly improves the reliability of network communications.

16 Claims, 8 Drawing Sheets

SYSTEM AND METHOD FOR AUTOMATIC ELECTION OF A REPRESENTATIVE NODE WITHIN A COMMUNICATIONS NETWORK WITH BUILT-IN REDUNDANCY

BACKGROUND OF THE INVENTION

1. Field of the Invention

The present invention relates to the field of network management. More specifically, the present invention relates to techniques for electing a representative node within a communication network such as a local area network (LAN).

2. Related Art

In a communication network where data is distributed from a central location (e.g., a server) to multiple nodes (e.g., clients), it is highly inefficient for every node to retrieve the same data directly from the central location because such activities generate an enormous volume of network traffic and thus adversely affect the performance of the network. Therefore, it is useful to identify a designated node among all the nodes that are within the network to act as a representative of the nodes for the purpose of data retrieval. This representative node, or master client ("master"), is responsible for retrieving data from the central location and then transmit the retrieved data to all other nodes that are interested in receiving the data.

In such a communication network, a single master is typically designated manually and arbitrarily before the network is set up. As such, configuring a master in those networks is time consuming and error prone. For instance, if the user fails to specify a master in the proper manner, network communications would have to revert to direct retrieval by individual nodes and network performance would therefore be significantly degraded. As another example, if the network configuration requires the presence of a master for the network to be operational, network communications may be completely disabled when a master is not properly specified. Furthermore, when the master is not properly specified, the whole network may have to be restarted, causing significant delay and disruption.

An additional disadvantage of providing a singularly specified master node in a communication network is that there is no redundancy. In the event that the master node becomes disabled, or otherwise fails to perform its tasks, the performance and reliability of network communications is severely compromised. One method of solving the redundancy problem is to designate a master node and several candidate nodes that would take over as master in a sequential fashion when the existing master fails. That method, although useful for its intended purposes in providing some degree of redundancy, is cumbersome to configure. The master and the candidate nodes have to be manually selected during power-on or when the network is set up. Another disadvantage is that, once all the candidate nodes are exhausted due to multiple failures, the network would again be without a master, causing deterioration or disruption in network communications.

Thus, there exists a need for a system and method whereby a master is selected from among the nodes within a communication network such that the selection of the master is not manual or arbitrary. Further, there exists a need for a method and system for selecting a master within a communication network such that network operations are not adversely affected upon the failure of the existing master.

SUMMARY OF THE INVENTION

Accordingly, the present invention offers a system and method for automatic election of a representative node ("master") within a communication network with built-in redundancy. In a communication network where data is distributed from a central location (e.g., a server) to multiple nodes (e.g., clients), the present invention enables one of the nodes to be automatically identified as a master of the nodes for retrieving data from the central location and then transmitting the data to all peer nodes interested in receiving the data. No manual intervention or pre-operation designation of a master is required within the present invention. As such, repetitive requests for information by individual nodes are eliminated, and the volume of network traffic is thereby significantly localized. Hence, the performance of the network is greatly enhanced. Furthermore, rather than arbitrarily preassigning particular node(s) to serve as a master, the present invention provides an automated process by which a new master is dynamically elected whenever an existing master fails or none exists. Therefore, the present invention provides built-in redundancy which greatly improves the reliability of network communications. These and other advantages of the present invention not specifically described above will become clear within discussions of the present invention herein.

Specifically, in one embodiment of the present invention, once a master is elected, it periodically broadcasts its master status (sends a "heartbeat") over the network. When a node powers up or fails to receive a heartbeat from the master within a timeout period, the node tries to identify or discover the master. Thereafter, each individual non-master node also actively ensures that communication between itself and the master remains viable. In another embodiment, when the master ceases to respond to its peer nodes requests, the peers are promptly alerted. The peers then initiate an election process by which a new master is elected.

BRIEF DESCRIPTION OF THE DRAWINGS

The accompanying drawings, which are incorporated n and form a part of this specification, illustrate embodiments of the present invention and, together with the description, serve to explain the principles of the invention.

DETAILED DESCRIPTION OF THE INVENTION

Figure 1A:
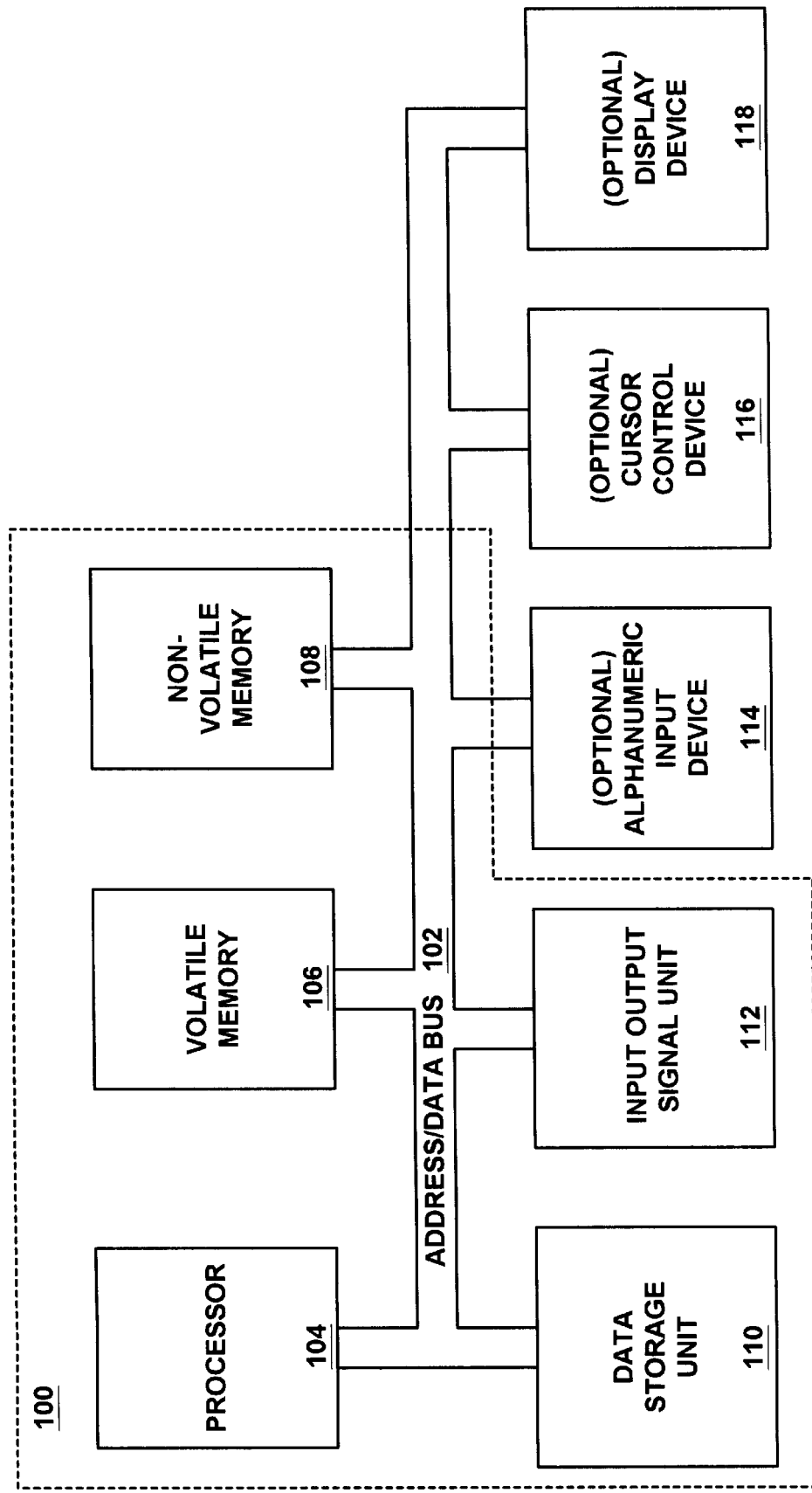
FIG. 1A is a general purpose computer system which provides an operational platform for embodiments of the present invention.

In the following detailed description of the present invention, a system and method for automatic election of a representative computer within a communication network with built-in redundancy, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "electing", "generating", "broadcasting", "recognizing", "monitoring" or the like, refer to the action and processes of a computer system (e.g., FIG. 1A), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., processes 200, 300, 400, 500, 600 and 700) are implemented as program code stored in computer readable memory units of a computer system and are executed by the processor of the computer system. Although a variety of different computer systems can be used with the present invention, an exemplary general purpose computer system 100 is shown in FIG. 1A.

In general, computer system 100 includes an address/data bus 102 for communicating information, a central processor 104 coupled with the bus for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 100 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Memory units of system 100 include 106, 108 and 110. Computer system 100 can also include a signal input output communication device 112 (e.g., modem, network interface card NIC) coupled to the bus 102 for interfacing with other computer systems.

Also included in computer system 100 of FIG. 1A is an optional alphanumeric input device 114 including alphanumeric and function keys coupled to the bus 102 for communicating information and command selections to the central processor 104. Computer system 100 also includes an optional cursor control or directing device 116 coupled to the bus 102 for communicating user input information and command selections to the central processor 104. An optional display device 118 can also be coupled to the bus 102 for displaying information to the computer user. Display device 118 may be a liquid crystal device, other flat panel display, cathode ray tube, or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

It is appreciated that computer system 100 described herein illustrates an exemplary configuration of a node within a communication network in accordance with the present invention. Nevertheless, other computer systems with differing configurations or other communications devices configured as network nodes can also be used in place of computer system 100 within the scope of the present invention.

Figure 1B:
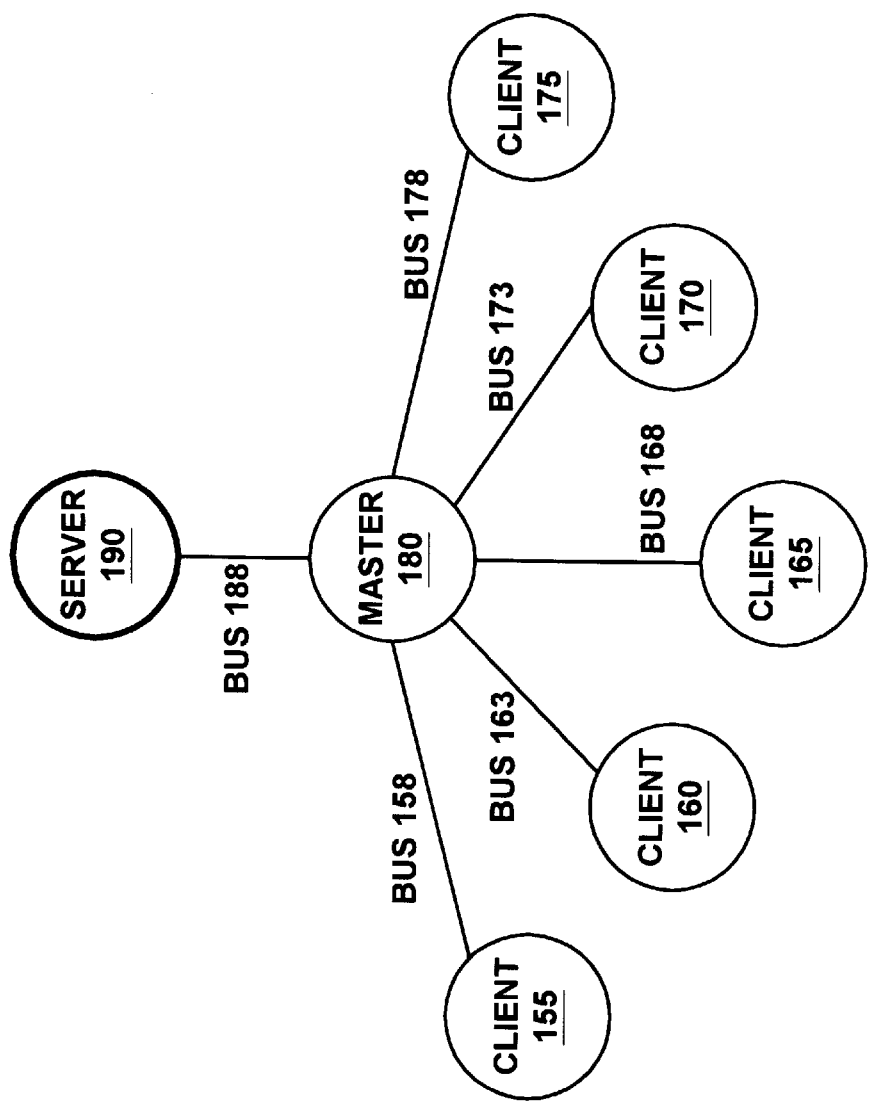
FIG. 1B is an exemplary communication network environment in accordance with the present invention.

FIG. 1B is an exemplary communication network environment 150 in accordance with the present invention. Within exemplary network domain 150, client nodes 155, 160, 165, 170 and 175 are communicatively coupled to master node 180 via buses 158, 163, 168, 173 and 178, respectively. Master node 180 is in turn communicatively coupled to server 190 via bus 188. In one embodiment, each of client nodes 155, 160, 165, 170 and 175 and master node 180 comprises computer system 100 of FIG. 1A. Thus, master node 180 can retrieve data directly from server 190 via bus 188. Thereafter, master node 180 can transmit the data thus retrieved to any of client nodes 155, 160, 165, 170 and 175 via the respective buses. As such, network traffic is not only localized over buses 158, 163, 168, 173 and 178 but is also minimized over bus 188, thereby significantly improving the performance of overall network communications. It is appreciated that when data has been received by master node 180 from server 190, the data can be transmitted from master node 180 to client nodes 155, 160, 165, 170 and 175 either at the request of the individual client nodes or upon initiation by master node 180.

Master Discovery Process

Figure 2:
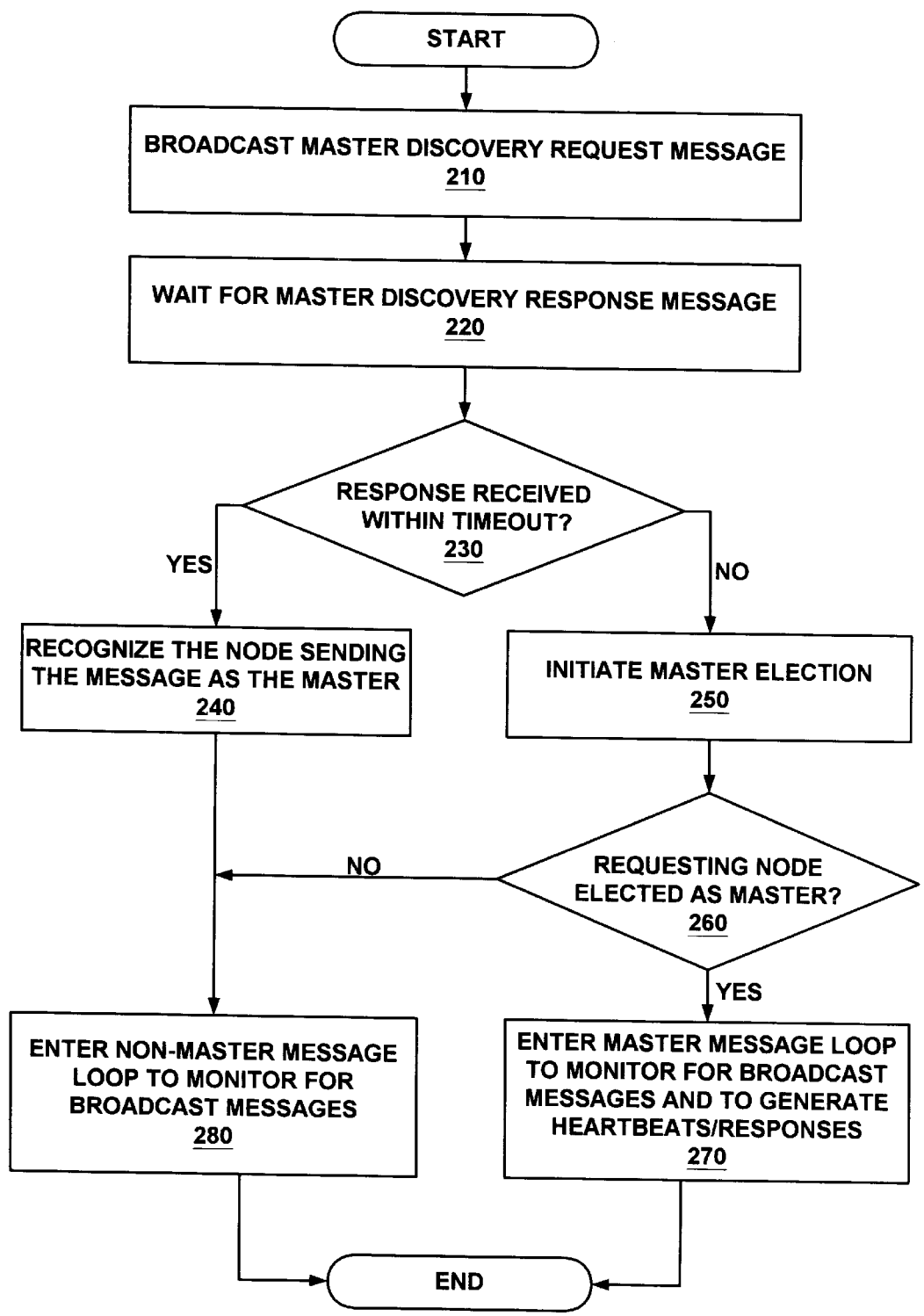
FIG. 2 is a flow diagram illustrating steps of the automatic process for a node to perform master discovery in accordance with the present invention.

FIG. 2 illustrates a computer system implemented automatic master discovery process 200 performed by a node to identify an existing master in accordance with the present invention. It is appreciated that within a communication network environment, a node performs process 200 either when the node is powered on or when the node has not received a master heartbeat message ("heartbeat") within a predetermined timeout period in accordance with the present invention. Under these two situations, the node in question ("requesting node") is unaware of which of its peer nodes is a master, if any. Thus, in an exemplary embodiment, the requesting node initiates process 200 to determine if a master is present within the network. Further, in a preferred embodiment, the communication network environment is an Ethernet broadcast domain. Nevertheless, it is appreciated that other network environments in which data is distributed from a central location (e.g., a server) to multiple nodes (e.g., clients) are also within the scope of the present invention.

Process 200 of the present embodiment begins with step 210. In step 210, the requesting node performing master discovery broadcasts a master discovery request (MDReq) message over the network. The MDReq message is received by all functioning nodes within the network but is ignored by all non-master nodes in accordance with the present invention.

It is appreciated that the master needs to monitor the network traffic for broadcast messages because the master needs to respond to certain messages from other nodes. For instance, when the master receives an MDReq message from a node, the master needs to respond with a master discovery response (MDResp) message to assert its presence. As another example, when the master receives an MDResp message from another node purporting to be the master, a negotiation for master status needs to be initiated to resolve the contention. These and other interactions between the master and the other nodes within the network are described in detail below.

Still referring to process 200 in FIG. 2, in step 220, the requesting node waits for a response to its MDReq message from a peer node which is acting as a master. In one embodiment, the requesting node continues waiting until a response is received or until a heartbeat timeout period has expired. In one embodiment, the heartbeat timeout period is set at two minutes but is programmable.

Next, in step 230, the requesting node determines whether a response to its MDReq message has been received within the heartbeat timeout period. If it is determined in step 230 that a response (an MDResp message) has been received by the requesting node within the heartbeat timeout period, then process 200 proceeds to step 240, in which the requesting node recognizes the peer node that has responded to the MDReq message as the master.

Next, process 200 of FIG. 2 proceeds to step 280, in which the requesting node enters a non-master message loop to monitor the network traffic for broadcast messages from the master and/or other peer nodes. Then, after step 280, process 200 terminates.

It is appreciated that although the master has been recognized in step 240 of process 200, a non-master node still needs to monitor the network traffic for relevant broadcast messages or absence thereof (step 280) because changes in the master status may subsequently arise. More particularly, if an existing master is powered off, becomes disabled, or is otherwise rendered incapable to communicate with the network, the remaining nodes within the network need to realize the absence of a master and a new master needs to be elected. By monitoring for broadcast messages (including periodic master heartbeat messages and master claim messages as described below) or absence thereof, non-master nodes are alerted to the absence of a functioning master and can initiate the election of a new master accordingly.

Still referring to process 200 in FIG. 2, if it is determined in step 230 that a response has not been received by the requesting node within the heartbeat timeout period, then process 200 proceeds instead to step 250, in which the requesting node initiates a master election process in accordance with the present invention. The master election process is discussed in detail below.

With reference still to process 200 in FIG. 2, after the master election process initiated in step 250 is completed, process 200 proceeds to step 260. In step 260, it is determined whether the requesting node itself has been elected as the master.

If it is determined in step 260 that the requesting node has been elected as the master, process 200 proceeds to step 270, in which the newly elected master enters a master message loop to monitor the network traffic for broadcast and directed messages from other nodes and to generate heartbeat and response messages. On the other hand, if it is determined in step 260 that the requesting node has not been elected as the master, process 200 proceeds to step 280, in which the requesting node enters a non-master message loop to monitor the network traffic for broadcast messages from the master and/or other peer nodes as described above. Thereafter, process 200 terminates.

Figure 3:
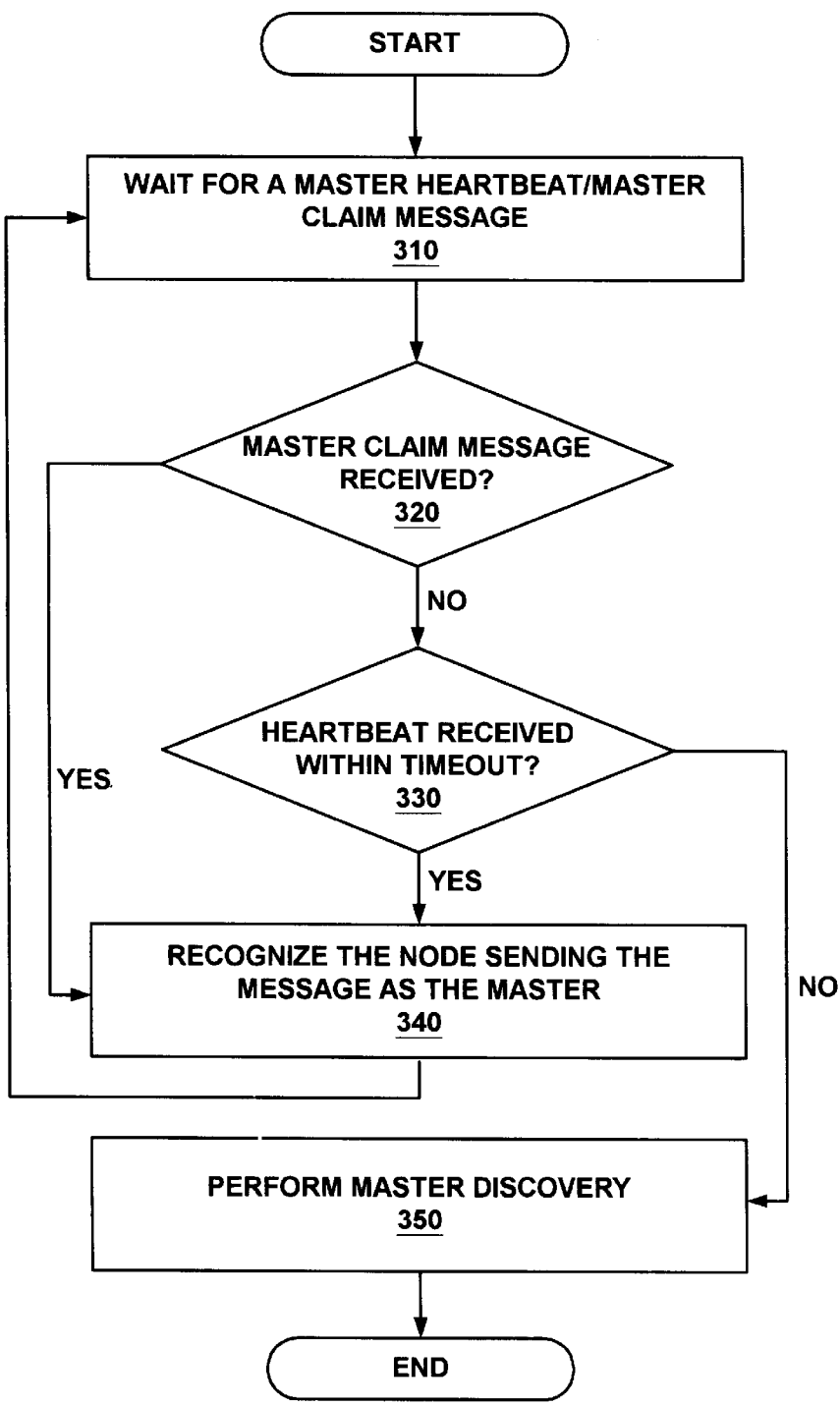
FIG. 3 is a flow diagram illustrating steps of the automatic process for a non-master node to monitor for broadcast messages in accordance with the present invention.

FIG. 3 is a flow diagram illustrating steps of a computer system implemented automatic process 300 for a non-master node to monitor the network traffic for broadcast messages in accordance with the present invention. In step 310, the non-master node monitors the network traffic for periodic master heartbeat messages (heartbeats) and occasional master claim (MC) messages.

In the present embodiment, the master periodically broadcasts a heartbeat over the network to inform other nodes within the network of the master's presence, as described in more detail below with reference FIG. 4. Thus, when a non-master node fails to receive an expected heartbeat within the heartbeat timeout period, the non-master node performs the master discovery process 200 (FIG. 2) so as to identify the existing master on the network, if any. Moreover, in the present embodiment, an MC message indicates that the node broadcasting the message is declaring itself to be the new master. Such declaration typically results from the declaring node's victory in the latest master election. Thus, when a non-master receives such an occasional MC message, the non-master node proceeds to recognize the declaring node as the master. Further discussions of the MC message is presented with respect to FIG. 4 below.

Still referring to process 300 in FIG. 3, in step 320, the non-master node determines whether an MC message from a peer node has been received, whereas in step 330, the non-master node determines whether a heartbeat has been received within the heartbeat timeout period. If it is determined that either an MC message (step 320) or a heartbeat (step 330) has been received within the heartbeat timeout period, process 300 proceeds to step 340, thus recognizing the peer node sending the instant MC message or heartbeat as the master. After step 340, process 300 returns to step 310 wherein the non-master node continues to monitor the network traffic for broadcast messages as thus described.

On the other hand, if it is determined that neither an MC message (step 320) nor a heartbeat (step 330) has been received within the heartbeat timeout period, then process 300 proceeds to step 350, in which the non-master node performs the master discovery process 200 in accordance with the present invention.

Although in this exemplary embodiment, process 300 proceeds to step 350 once it is determined in step 330 that a heartbeat has not been received by the non-master node within the heartbeat timeout period, it is appreciated that within the scope of the present invention process 300 can alternatively allow multiple heartbeat timeouts (e.g., 3 consecutive timeouts) to elapse before proceeding to step 350 to perform the master discovery process 200. As such, process 300 incorporates a higher tolerance level with respect to the timely receipt of heartbeats. More specifically, if the non-master node fails to receive a particular heartbeat due to reasons other than the master becoming unavailable (e.g., a network glitch), the non-master node is nevertheless very likely to receive the next scheduled heartbeat from the master. Under such circumstances, the higher tolerance level averts the initiation of master discovery prematurely.

Figure 4:
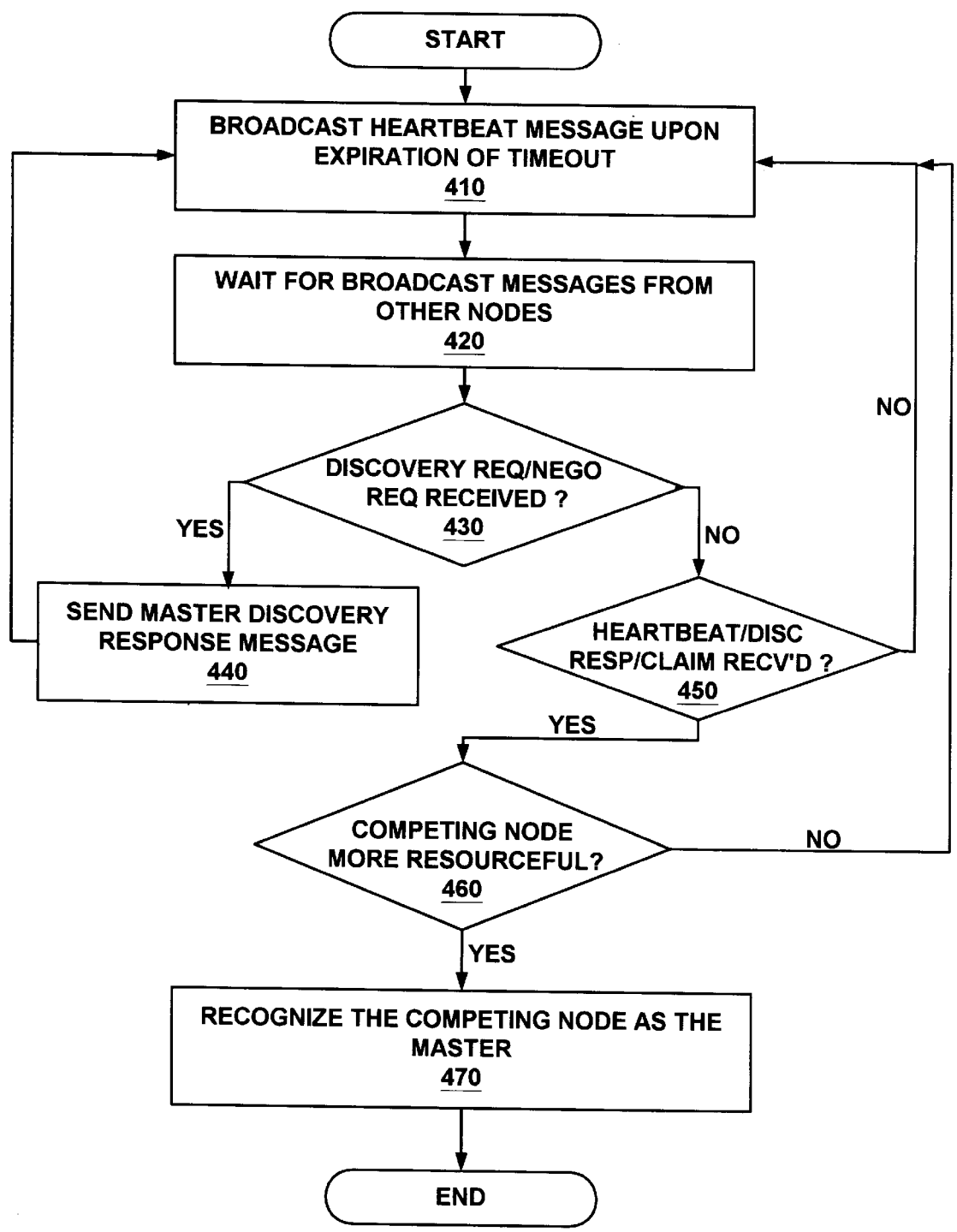
FIG. 4 is a flow diagram illustrating steps of the automatic process for a master to monitor for broadcast messages in accordance with the present invention.

FIG. 4 shows a flow diagram illustrating steps of a computer system implemented automatic process 400 which a master performs to monitor the network traffic for broadcast messages in accordance with the present invention. In step 410, the master broadcasts a periodic heartbeat over the network upon the expiration of the heartbeat timeout period to assert its presence.

In step 420, the master monitors the network traffic for broadcast messages from other nodes within the network.

In step 430, the master determines whether it has received an MDReq message or a master negotiation request (MNR) message from the other nodes.

In the present embodiment, an MDReq message indicates that the node broadcasting the message is trying to identify the existing master within the network. Thus, the master needs to respond with an MDResp message to inform the requesting node of its presence. Moreover, in the present embodiment, an MNR message indicates that the node broadcasting the message has failed to identify an existing master and is therefore trying to become the master itself. Thus, the master again needs to respond with an MDResp message to assert its presence so that the node attempting to become the master aborts its effort and backs down.

Thus, still referring to process 400 in FIG. 4, if it is determined in step 430 that either type of message (MDReq or MNR) has been received by the master, then in step 440, the master sends an MDResp message to the node that generated the request message. Thereafter, process 400 returns to step 410 wherein the master continues to broadcast periodic heartbeats (step 410) and monitor the network traffic for broadcast messages (step 420) as thus described.

On the other hand, if it is determined in step 430 that neither an MDReq message nor an MNR message has been received by the master, then process 400 proceeds to step 450, in which the master then determines whether it has received a heartbeat, an MDResp message or an MC message from another node.

In the present embodiment, an MC message indicates that the node broadcasting the message is declaring itself to be the new master, while a heartbeat or an MDResp message indicates that the sender identifies itself to be an existing master. Thus, when the master receives any of these messages, the master needs to arbitrate with the sender(s) of such message(s) in order to determine which among all the purported masters should be the genuine master. The contention among multiple nodes with respect to the master status is thus resolved. It is rare for multiple masters to exist simultaneously within the network in accordance with the present invention. Nevertheless, malfunctioning of individual nodes, such as the presence of a network interface card that can send but cannot detect messages being broadcasted over the network, can result in the corresponding node claiming to be the master inadvertently due to its misinformed conclusion that there is no existing master within the network even though the contrary is true.

Still referring to process 400 in FIG. 4, if it is determined in step 450 that any of the three types of messages (heartbeat, MDResp, MC) has been received by the master, process 400 proceeds to step 460, in which the master determines whether the competing node is more resourceful than the master itself. If the competing node is more resourceful, process 400 proceeds to step 470 in which the master gives up its master status and recognizes the competing node as the new master, and process 400 terminates; otherwise, if the master is more resourceful, the master retains its master status, the competing node backs down, and process 400 returns to step 410.

In one embodiment, the resource level of a node is determined by the amount of available memory at the node, the type of processor of the node and the version of the node's operating system (with Windows NT being the preferred operating system). The node having the highest resource level wins in an arbitration. It is appreciated that when two competing nodes have equivalent resources in all these aspects, an additional predetermined criterion can be used to resolve the tie in an arbitration. In one embodiment, the node having the lower physical address wins in case of a tie.

With reference still to process 400 in FIG. 4, if it is determined in step 450 that none of the three types of messages has been received by the master, process 400 returns to step 410 wherein the master continues to broadcast periodic heartbeats (step 410) and monitor the network traffic for broadcast messages (step 420) as described above.

In the present embodiment, the master broadcasts periodic heartbeats over the network to inform other nodes within the network of the master's presence. Thus, non-master nodes are reassured of the master's presence at regular intervals. More specifically, the master broadcasts a heartbeat upon the expiration of the heartbeat timeout period. As stated above, in one embodiment, the heartbeat timeout period is set at two minutes. Further, it is reiterated that within the scope of the present invention multiple heartbeat timeouts can be allowed to elapse before a non-master node proceeds to perform the master discovery process 200. In one embodiment, three consecutive heartbeat timeouts are tolerated before master discovery is performed. As such, the higher tolerance level with respect to detection of periodic heartbeats serves to avert the initiation of master discovery prematurely.

Master Election Process

Figure 5:
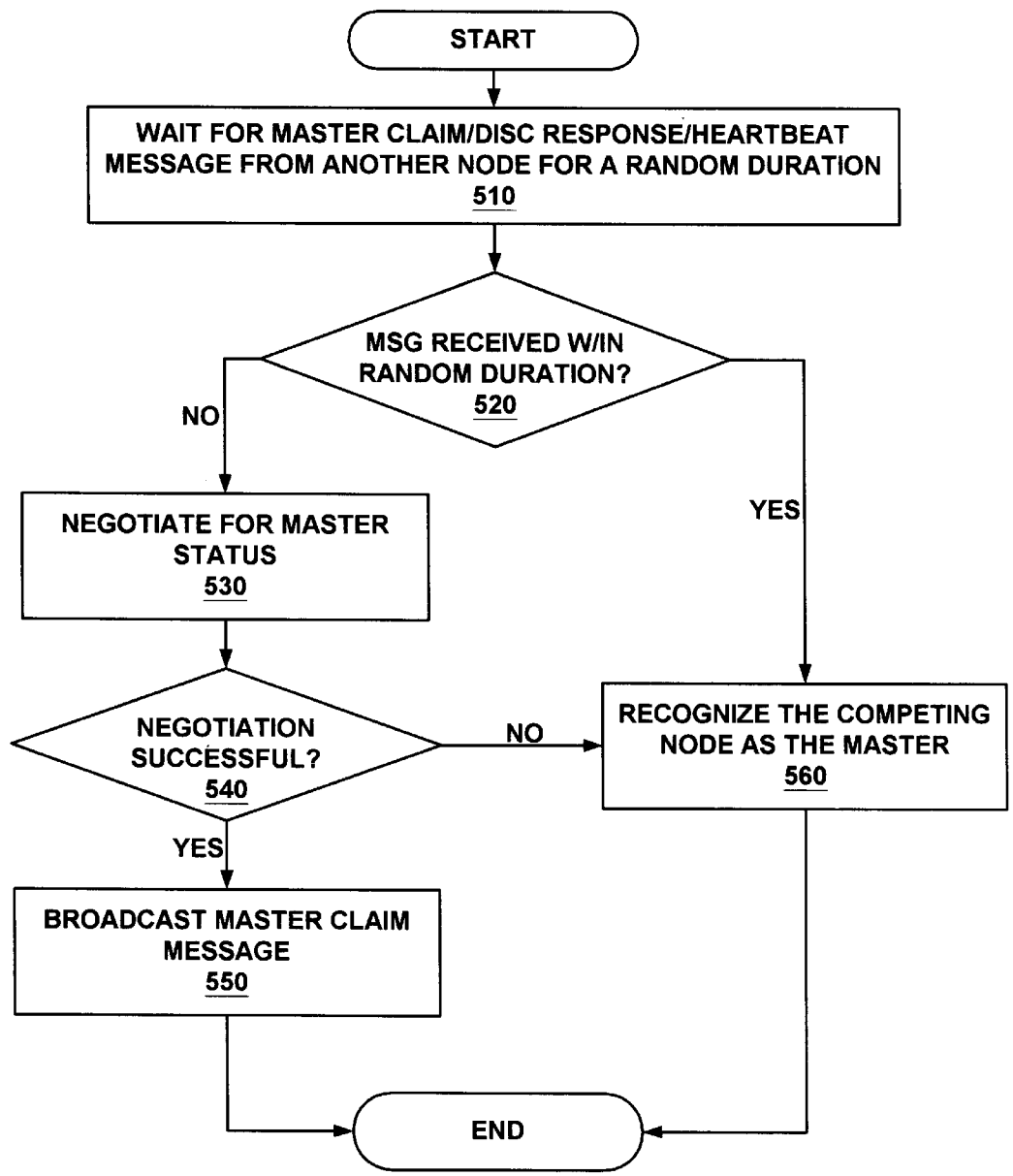
FIG. 5 is a flow diagram illustrating steps of the automatic process for a node to perform master election in accordance with the present invention.

FIG. 5 is a flow diagram illustrating steps of a computer system implemented automatic process 500 for electing a master in accordance with the present invention. In step 510, the non-master node that initiates the master election ("initiating node") monitors the network traffic for MC, messages, MDResp messages or heartbeats that may originate from a competing node. After waiting a random duration of time ("backoff delay") for such messages, process 500 proceeds to step 520.

In step 520, the initiating node determines whether any of the three types of messages (MC, MDResp, heartbeat) has been received within the backoff delay. If it is determined in step 520 that any of the three types of messages has been received by the initiating node within the backoff delay, process 500 proceeds to step 560, thus recognizing the competing node (here, the node sending the instant MC message, MDResp message or heartbeat) as the master. Thereafter, process 500 terminates.

On the other hand, if it is determined in step 520 that none of the three types of messages has been received by the initiating node within the backoff delay, then process 500 proceeds to step 530, in which the initiating node begins a negotiation with any other contending node(s) for master status in accordance with the present invention.

Referring still to process 500 in FIG. 5, in step 540, the outcome of the negotiation of step 530 is determined. If it is determined in step 540 that the initiating node has succeeded in gaining the master status, process 500 proceeds to step 550, wherein the initiating node, now being the newly elected master, broadcasts a master claim (MC) message over the network announcing its master status.

On the other hand, if it is determined in step 540 that the initiating node has not been elected to be the master, process 500 proceeds to step 560 in which the initiating node recognizes the competing node (here, the node that prevails in the negotiation) as the master. Then, process 500 terminates.

In the present embodiment, multiple nodes may realize the absence of a master at about the same time such that each one of these initiating nodes is attempting to become the master simultaneously. Thus, in order to minimize network congestion during the master election process, each initiating node waits random period of time ("backoff delay"), up to a predetermined maximum duration, before commencing negotiation for master status in accordance with the present invention. Moreover, as described above, it is appreciated that an MC message indicates that the node broadcasting the message is declaring itself to be the new master, while a heartbeat or an MDResp message indicates that the sender identifies itself to be the master. Therefore, when an initiating node receives any of these messages from such a sender within the backoff delay and thus prior to commencing negotiation for master status, the initiating node simply recognizes the sender as the master and terminates the instant master election process.

In contrast, once an initiating node has successfully negotiated for master status and has broadcasted its own MC message, other initiating nodes that are still at the negotiation stage will back down and recognize the successful initiating node as the new master upon receipt of the MC message. In other words, once a new master has been elected, the master election process is automatically terminated in a prompt and orderly fashion and all other nodes are immediately notified about the new master by way of the MC message.

Figure 6:
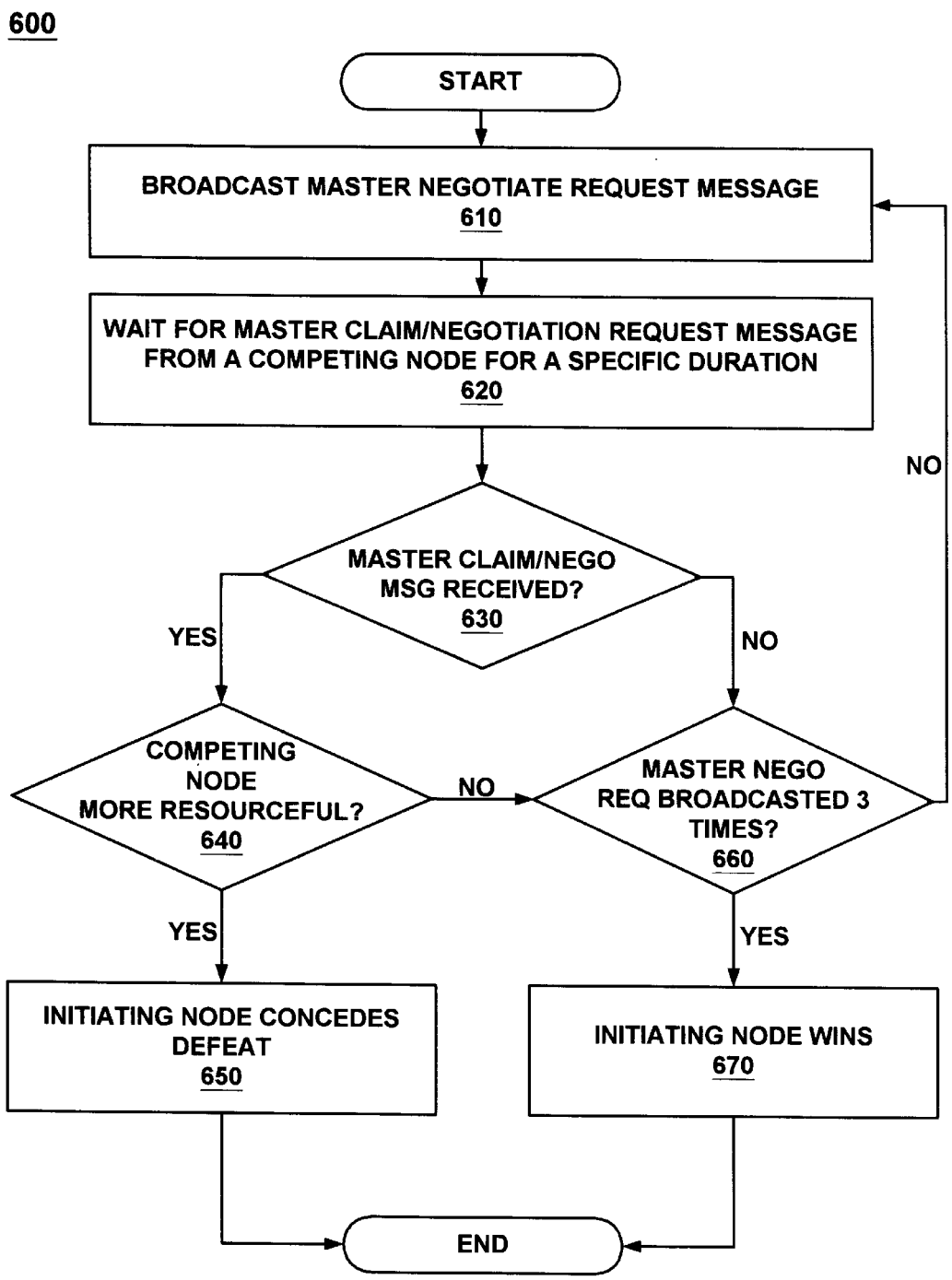
FIG. 6 is a flow diagram illustrating steps of the automatic process for a node to negotiate for master status in accordance with the present invention.

FIG. 6 shows a flow diagram illustrating steps of a computer system implemented automatic process 600 which a node performs to negotiate for master status in accordance with the present invention. In step 610, the initiating node broadcasts a master negotiation request (MNR) message over the network to commence negotiation for master status.

In step 620, the initiating node monitors the network traffic for any MC message or MNR message from a competing node. After waiting a specific period of time ("negotiation timeout") for such messages, process 600 proceeds to step 630.

In step 630, the initiating node determines whether any MC message or MNR message has been received within the negotiation timeout.

If it is determined in step 630 that either an MC message or an MNR message has been received by the initiating node from a competing node within the negotiation timeout, then process 600 proceeds to step 640, wherein the initiating node determines whether the competing node is more resourceful than the initiating node itself. If the competing node is more resourceful, process 600 proceeds to step 650 in which the initiating node concedes defeat; otherwise, if the initiating node is more resourceful, process 600 proceeds to step 660.

On the other hand, if it is determined in step 630 that neither an MC message or an MNR message has been received by the initiating node within the negotiation timeout, process 600 proceeds to step 660, wherein the initiating node determines whether it has broadcasted an MNR message three times yet. If the initiating node has already broadcasted an MNR message three times at this point, process 600 proceeds to step 670 in which the initiating node reports it has succeeded in negotiating for master status; otherwise, process 600 returns to step 610 in which the initiating node broadcasts an MNR message again. described above, in the present embodiment, an MC message indicates that a competing node is declaring itself to be the new master, while an MNR message indicates a competing node has also begun negotiation in an attempt to become the master, just as the initiating node has. Therefore, when the initiating node receives either an MC message or an MNR message from a competing node within the negotiation timeout, the resources of the initiating node and the competing node are compared in an arbitration. If the competing node is more resourceful, the initiating node drops out of the negotiation and concedes defeat with respect to the master status. However, if the initiating node is more resourceful, it remains in the running and the competing node drops out instead.

In a preferred embodiment of the present invention, an initiating node needs to persevere through the negotiation for three cycles before it can declare itself to be the winner in the master status negotiation. In other words, the initiating node has to have broadcasted an MNR message three times without being defeated by a competing node in an intervening arbitration in order to win the master status. As such, less resourceful competing nodes are promptly screened out by the negotiation process. Further, it is appreciated that the number of repetitions of MNR broadcasts required to win an arbitration described herein (e.g., three) is exemplary and can be varied within the scope of the present invention. For instance, a single successful negotiation cycle can be the criterion for winning an arbitration within the present invention.

In one embodiment, an initiating node sends a directed loss notification message to other competing nodes upon winning an arbitration. When the other competing nodes receive the loss notification message, they back down and return to their non-master status and the arbitration is promptly concluded.

Figure 7:
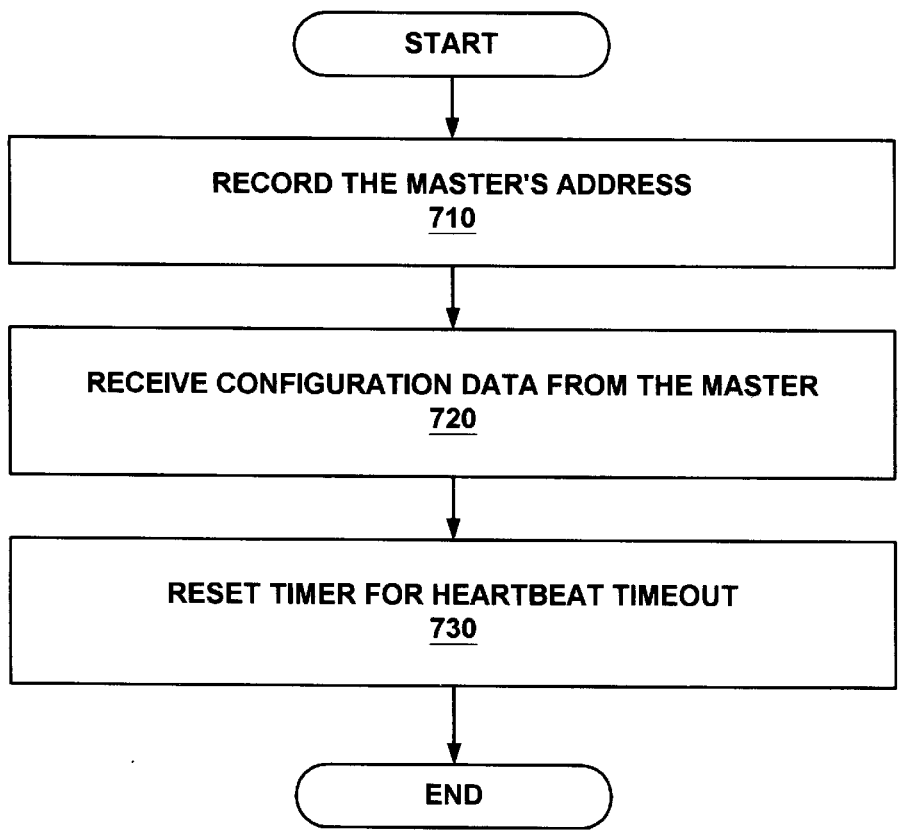
FIG. 7 is a flow diagram illustrating steps of the automatic process for a node to recognize a peer node as the master in accordance with the present invention.

FIG. 7 shows a flow diagram illustrating steps of a computer system implemented automatic process 700 which a node performs to recognize a peer node as the master in accordance with the present invention. In step 710, the node records the master's address.

Next, in step 720, the node receives configuration data from the master.

Then, in step 730, the node resets the timer used to keep track of master heartbeat timeout. Thereafter, process 700 terminates. It is appreciated that individual non-master nodes record the address and configuration data of the master so that the non-master nodes can easily initiate communications with the master as necessary.

In one embodiment, the present invention is implemented using the Adapter Management Protocol (AMP) developed by 3Com Corporation of Santa Clara, Calif. It is appreciated that AMP is particularly suited for use with the present invention because AMP affords features such as multicasting capabilities and Mib Object processing. The use of AMP Mib Objects allows processes of the present invention to be implemented efficiently based on a message-driven model. More specifically, in a preferred embodiment, messages communicated among the nodes within a network of the present invention utilize AMP Mib Objects to package the data that needs to be transferred, such as node information required during the master negotiation process. It is appreciated that although 3Com's AMP is used in a preferred embodiment of the present invention, other network management protocols can also be used within the scope of the present invention.

It is appreciated that in certain network environments multi-homed nodes can be present. A multi-homed node is a node that belongs to multiple physical networks or network segments ("domains") simultaneously. A preferred embodiment of the present invention is capable of handling multi-homed nodes. In particular, to manage a multi-homed node, the present invention creates a separate dataspace for each physical network interface (e.g., network interface card NIC) of the node. The present invention maintains a data structure that stores the indices of the interfaces, thereby keeping track of the multiple interfaces. Within a multi-homed node, each interface communicates with its corresponding domain, has its own status as a master or non-master node with respect to its respective domain, and is independently involved in the master elections and negotiations of its respective domain. Specifically, it is possible to have multiple masters residing in the same multi-homed node where the node has been elected as masters in different domains through the node's multiple interfaces. Further, if the multi-homed node is connected to a database, all masters residing in the node may be multiplexed via the same connection to the database, so that multiple database connections are unnecessary.

By providing a master discovery process whereby a rode can identify an existing master, if any, and also a master election process whereby a node can initiate the election of a master whenever none is present within the network, the present invention offers a system and method for automatic election of a master within a communication network with built-in redundancy. The master serves to retrieve data from a central location such as a file server and then forward the data to all peer nodes interested in receiving the data. Importantly, no manual pre-operation designation of a master or manual intervention upon the master's failure is required within the present invention. As such, while the present invention eliminates repetitive requests for information by individual nodes and thereby greatly enhances network performance, the present invention also affords such performance improvements in a fully automated manner and with built-in redundancy. As a result, the reliability of network communications is also greatly improved.

The preferred embodiment of the present invention, a system and method for automatic election a representative node within a communication network with built-in redundancy, is thus described. While the present invention has been described in particular embodiments, it should be appreciated that the present invention should not be construed as limited by such embodiments, but rather construed according to the below claims.

What is claimed is:

1. A computer implemented method for arbitrating among nodes within a communication network having a plurality of client nodes communicatively coupled together, said method comprising the steps of:
   a) a first client node broadcasting a first message to said nodes in response to an absence of master node-initiated messages during a predetermined time period, said first message for identifying a viable master node in said communication network, said first client node initiating an election process for dynamically electing a new master node from among said plurality of client nodes only when no response is received from an existing master node to said first message, said election process comprising the steps of:
      a1) said first client node broadcasting a first master negotiate request (MNR) message to said plurality of client nodes;
      a2) provided that said first client node does not receive a message in response to said MNR message from a second client node, said first client node asserting itself as said new master node; and
      a3) provided that said first client node does receive a message in response to said MNR message from a second client node, comparing resources of said first client node to resources of said second client node, wherein results of said comparing are used to select said new master node; and
   b) in response to said step a) wherein said new master node is selected, said new master node periodically broadcasting heartbeat messages to said plurality of client nodes.

2. The method as recited in claim 1 wherein said step b) is performed whenever a heartbeat timeout period expires.

3. The method as recited in claim 2 further comprising the step of:
   c) said plurality of client nodes monitoring to receive said heartbeat messages within said heartbeat timeout period to ensure that said new master node is viable.

4. The method as recited in claim 3 wherein said step a1) comprises the step of said first client node broadcasting said first MNR message to said plurality of client nodes provided that said first client node does not receive a master discovery response (MDResp) message within a certain period of time.

5. The method as recited in claim 3 wherein said steps a2) and a3) further comprise the steps of:
   provided that said first client node does not receive a first MC message and does not receive a second MNR message from said second client node within a negotiation timeout period after broadcasting said first MNR message, said first client node broadcasting a second MC message to said plurality of client nodes; and
   provided that said first client node receives at least one of said first MC message and said second MNR message from said second client node within said negotiation timeout period after broadcasting said first MNR message:
      said first client node broadcasting said second MC message to said plurality of client nodes provided that said first client is more resourceful than said second client node; and
      said first client node recognizing said second client node as said new master node provided that said second client is more resourceful than said first client node.

6. The method as recited in claim 3 wherein said step a) further comprises the step of:

said existing master node monitoring to respond to said first message from one of said plurality of client nodes.

7. The method as recited in claim 6 further comprising the step of:

soliciting a response from said existing master node provided that one of said plurality of client nodes is powered on.

8. The method as recited in claim 6 further comprising the step of:

said plurality of client nodes monitoring to receive a master claim (MC) message to update the identity of said new master node.

9. A computer system coupled to a communication network having a plurality of client nodes communicatively coupled together, wherein said computer system is one of said plurality of client nodes and comprises a processor coupled to a bus and a memory unit coupled to said bus, said memory unit having stored therein instructions that when executed implement a method for arbitrating among said plurality of client nodes, said method comprising the steps of:

a) a first client node broadcasting a first message to said nodes in response to an absence of master node-initiated messages during a predetermined time period, said first message for identifying a viable master node in said communication network, said first client node initiating an election process for dynamically electing a new master node from among said plurality of client nodes only when no response is received from an existing master node to said first message, said election process comprising the steps of:

a1) said first client node broadcasting a first master negotiate request (MNR) message to said plurality of client nodes;

a2) provided that said first client node does not receive a message in response to said MNR message from a second client node, said first client node asserting itself as said new master node; and a3) provided that said first client node does receive a message in response to said MNR message from a second client node, comparing resources of said first client node to resources of said second client node, wherein results of said comparing are used to select said new master node; and b) in response to said step a) wherein said new master node is selected, said master node periodically broadcasting heartbeat messages to said plurality of client nodes.

10. The computer system as recited in claim 9 wherein said step b) of said method is performed whenever a heartbeat timeout period expires.

11. The computer system as recited in claim 10 wherein said method further comprises the step of:

c) said plurality of client nodes monitoring to receive said heartbeat messages within said heartbeat timeout period to ensure that said new master node is viable.

12. The computer system as recited in claim 11 wherein said step a1) of said method comprises the step of said first client node broadcasting said first MNR message to said plurality of client nodes provided that said first client node does not receive a master discovery response (MDResp) message within a certain period of time.

13. The computer system as recited in claim 11 wherein said steps a2) and a3) of said method further comprise the steps of:

provided that said first client node does not receive a first MC message and does not receive a second MNR message from said second client node within a negotiation timeout period after broadcasting said first MNR message, said first client node broadcasting a second MC message to said plurality of client nodes; and provided that said first client node receives at least one of said first MC message and said second MNR message from said second client node within said negotiation timeout period after broadcasting said first MNR message:

said first client node broadcasting said second MC message to said plurality of client nodes provided that said first client is more resourceful than said second client node; and said first client node recognizing said second client node as said new master node provided that said second client is more resourceful than said first client node.

14. The computer system as recited in claim 11 wherein said method further comprises the step of:

said existing master node monitoring to respond to said first message from one of said plurality of client nodes.

15. The computer system as recited in claim 14 wherein said method further comprises the step of:

soliciting a response from said existing master node provided that one of said plurality of client nodes is powered on.

16. The computer system as recited in claim 14 wherein said method further comprises the step of:

said plurality of client nodes monitoring to receive a master claim (MC) message to update the identity of said master new node.

\* \* \* \* \*